(12) United States Patent
Ricketts et al.

(10) Patent No.: US 7,997,967 B2
(45) Date of Patent: Aug. 16, 2011

(54) AGRICULTURAL COMBINE GRAIN CLEANING SIEVE WITH ADJUSTABLE SPACING SYSTEM

(75) Inventors: Jonathan E. Ricketts, Ephrata, PA (US); Curtis F. Hillen, Leola, PA (US); Denver R. Yoder, Manheim, PA (US)

(73) Assignee: CNH America LLC, New Holland, PA (US)

( * ) Notice: Subject to any disclaimer, the term of this patent is extended or adjusted under 35 U.S.C. 154(b) by 107 days.

(21) Appl. No.: 12/608,263

(22) Filed: Oct. 29, 2009

(65) Prior Publication Data

US 2010/0113113 A1   May 6, 2010

Related U.S. Application Data

(60) Provisional application No. 61/197,935, filed on Oct. 31, 2008.

(51) Int. Cl.
*A01F 12/32* (2006.01)
*B07B 1/00* (2006.01)

(52) U.S. Cl. .................................. 460/101; 209/394

(58) Field of Classification Search .............. 460/97, 460/101, 102, 902, 120; 209/394, 398, 404, 209/671, 672, 674, 676; 312/213, 223.1; 49/74.1, 80.1, 77.1, 403; 454/221, 224, 268, 454/264, 265, 281, 309
See application file for complete search history.

(56) References Cited

U.S. PATENT DOCUMENTS

| 0,064,218 A | 4/1867 | Hart |
| 579,793 A * | 3/1897 | Ditch ............................ 209/394 |
| 0,770,079 A | 9/1904 | Lamb |
| 0,792,485 A | 6/1905 | Williams |
| 0,958,343 A | 5/1910 | Whitman |
| 960,111 A * | 5/1910 | Robinson ..................... 209/486 |
| 1,025,791 A | 5/1912 | Donges |
| 2,069,370 A * | 2/1937 | Johnson ........................ 160/104 |
| 2,253,296 A * | 8/1941 | Holtzman .................... 209/394 |
| 2,362,099 A * | 11/1944 | Sargent ........................ 209/394 |
| 2,552,982 A * | 5/1951 | Lambert ......................... 49/371 |
| 3,270,657 A * | 9/1966 | Jaye ............................. 454/320 |
| 3,334,744 A * | 8/1967 | Howell et al. ................ 209/394 |
| 3,385,438 A * | 5/1968 | Fisher .......................... 209/394 |
| 4,502,493 A * | 3/1985 | Jones et al. ................... 460/101 |
| 4,770,190 A | 9/1988 | Barnett |
| 5,176,574 A * | 1/1993 | Matousek et al. ........... 460/100 |
| 5,462,174 A * | 10/1995 | Truckenbrod et al. ....... 209/394 |
| 5,769,709 A * | 6/1998 | Kim ............................. 454/318 |
| 5,782,365 A | 7/1998 | Zreloff et al. |
| 6,053,330 A | 4/2000 | Lavoie |

(Continued)

FOREIGN PATENT DOCUMENTS

| JP | 6046663 | 2/1994 |
| JP | 2006246779 | 9/2006 |

*Primary Examiner* — Thomas B Will
*Assistant Examiner* — Joan D Misa
(74) *Attorney, Agent, or Firm* — Michael G. Harms; Patrick M. Sheldrake

(57) ABSTRACT

A sieve for a grain cleaning system of an agricultural combine, including a system providing enhanced adjustability of spacing, including capacities for quickly and easily varying a number of rows of sieve fingers, spacing between the rows, and angular orientation of the fingers, such that better sieve performance, and cleaning action above the sieve, can be achieved for a particular grain or seed size and other conditions, particularly very large sizes and very small sizes.

17 Claims, 9 Drawing Sheets

U.S. PATENT DOCUMENTS

| | | |
|---|---|---|
| 7,117,996 B1 | 10/2006 | Mobley et al. |
| 7,399,223 B2 * | 7/2008 | Weichholdt et al. .......... 460/101 |
| 7,448,498 B2 | 11/2008 | McRobert |
| 7,566,266 B1 * | 7/2009 | Ricketts et al. ............... 460/101 |

* cited by examiner

AGRICULTURAL COMBINE GRAIN CLEANING SIEVE WITH ADJUSTABLE SPACING SYSTEM

This application claims the benefit of U.S. Provisional Application No. 61/197,935, filed Oct. 31, 2008.

TECHNICAL FIELD

This invention relates generally to a sieve for a grain cleaning system of an agricultural combine, and, more particularly, including a spacing system providing enhanced adjustability, including capacities for quickly and easily varying a number of rows of sieve fingers, spacing between rows, and angular orientation of the fingers, for better customizing the sieve for a particular grain size and other conditions.

BACKGROUND ART

U.S. Provisional Application No. 61/197,935, filed Oct. 31, 2008, is incorporated herein in its entirety by reference.

In the harvesting of crops it is desired that the grain or seed, hereafter jointly referred to as grain, be separated from other elements or portions of the crop, such as from pod or cob fragments, straw, stalks, and the like.

Agricultural combines typically have employed a rotary threshing or separating system for separating the grain from such other crop elements or portions. In general, a rotary threshing or separating system includes one or more rotors, which can extend axially (front to rear) or transversely within the body of the combine, and which are partially or fully surrounded by a perforated concave. The crop material is threshed and separated by the rotation of the rotor within the concave, and the separated grain, together with some particles, such as chaff, dust, straw, and crop residue collectively referred to as material other than grain (MOG), are discharged through the perforations of the concave so as to fall onto a grain bed or pan, or so as to fall directly onto the cleaning system itself.

Cleaning systems further separate the grain from MOG and typically include a fan directing an air flow stream upwardly and rearwardly through one or more fore to aft reciprocating sieves, typically two, including an upper sieve also referred to as a chaffer, which is more open or coarse, and a lower sieve which is more closed or fine. The air flow stream operates to lift and carry the lighter elements of the MOG towards the rear end of the combine for discharge therefrom. Clean grain, being heavier, and larger pieces of MOG, which are not carried away by the air flow stream, will fall onto the surface of the upper sieve where some or all of the clean grain passes through to the lower, finer sieve. Grain and MOG remaining on the sieve surfaces are physically separated by the reciprocal action of the sieves as the material moves rearwardly therealong. Any grain and/or MOG remaining on the surface of the upper sieve are discharged at the rear of the combine, while grain and/MOG on the lower sieve may be conveyed to an internal tailings system for reprocessing.

The quantity of clean grain and MOG passing through the sieves is typically controllable, in part, by varying the opening size of the sieves. To this end, sieves include rows of fingers, each row supported on an elongate element such as a shaft, together referred to as a slat or louver, which is typically rotatable about a longitudinal axis therethrough for setting a sieve size or gap. A typical sieve includes an adjusting member which contacts each of the slats or louvers. Modern combines use a linkage and/or cable arrangement connected between the adjusting member and one or more manually or automatically movable adjusting elements or adjustors, in the latter instance, which can be moved by an actuator driven by an electrical, fluid, or other controller for moving the linkage or cable arrangement and member and thus changing the angular orientation of the slats and as a result, the opening size.

The adjacent rows of fingers define laterally extending grain passages between confronting surfaces of adjacent rows of fingers. Rotating the longitudinal elements or shafts rotates the rows of fingers through various angular positions, to increase or decrease the opening size of the passages between the adjacent rows. Thus, material passes through the sieve by falling generally vertically through the spaces between the fingers or by entering the passages between the rows and falling through at the angle defined by the angular position of the rows of fingers as the sieve is reciprocated.

Generally, as the rows of fingers are rotated more towards a vertical orientation, the opening size of the passages between the rows is increased to allow more crop material to fall through the sieve through the lateral passages. Also, upward air flow through the sieve will typically be higher as a result of the larger opening size and less restriction. And, because the fingers are more vertical, the grain passages through the sieve are more vertical, so that grain flow through the sieve will be faster and more direct. If the opening size of the passages is too large, a downside is that an increased amount of MOG will be allowed to pass through the sieve. Conversely, as the rows of fingers are rotated more towards a horizontal orientation, the opening size of the passages between the rows is decreased to allow less crop material to fall through the sieve. Because opening size is smaller, upward air flow through the sieve will typically be lower. The grain passages will also be more horizontal, such that grain flow will be longer and less direct, compared to a more vertical orientation. If the opening size of the passages is too small, less MOG is allowed to pass through the sieve, but less clean grain falls through the sieve as well. Therefore, if the sieve passages are opened too much, increased MOG is allowed therethrough, and if the sieve passages are opened too little, less MOG passes therethrough, but grain throughput is reduced.

Often, the sieve setting will be selected for a particular grain variety and other conditions, and the fan speed will be adjusted to achieve an acceptable grain loss level, that is, grain not allowed through the sieve and which is detected as it is discharged past the rear edge of the sieve. In this regard, operators will commonly not be able to achieve optimal grain loss levels of zero or almost zero, and will tolerate greater grain loss than could be attained by adjusting just sieve opening size and fan speed, because minimizing grain loss will often entail opening the upper sieve or chaffer to such an extent that a large amount of MOG will pass therethrough onto the lower sieve, and will be directed by that sieve to the tailings system for reprocessing, sometimes repeatedly.

Many commercially available combine sieves are configured to allow a sufficient range of adjustability of the opening size for accommodating a wide range of crops, including smaller grains such as wheat and rice, and larger grains such as corn, soybeans and other legumes. To have sufficiently large openings for passage of the largest grain sizes, the adjacent slats or louvers must be adequately far apart, and will typically be opened to a relatively upstanding position. In contrast, for the smallest grains, the slats will be positioned more horizontally or closed. As a result, the grain path through the sieve will be longer and less direct, which can negatively affect grain processing and throughput particularly under high yield conditions. A more closed position can also reduce air flow upwardly through the sieve to the region thereabove, which can reduce the cleaning or separating action in that region.

As a proposed solution to the above problems and shortcomings, it is common to utilize different sieves for different crops, a sieve with a larger spacing between adjacent louvers or slats for larger grains, and a sieve with smaller spacing for smaller grains. However, even with multiple sieves available it has been found that it may not always be possible to achieve the best louver spacing or opening size for every crop and crop condition, particularly very large and very small grain sizes.

Ideally while the portion of the flow of crop material including the higher density of grain and MOG is airborne en route to the forward portion of the upper sieve, the flow of air at a significantly higher air flow rate generated by the cleaning fan will be directed therethrough for separating the lighter MOG from the heavier grain such that the lighter MOG will be carried rearwardly over the upper sieve, and the heavier, smaller grain will be allowed to fall onto the upper sieve where it can fall through the spaces between the adjacent fingers of the upper sieve to the lower sieve. Thus, by virtue of the air flow through the airborne flow of crop material, some separation of grain from MOG will occur above the surface of the upper sieve, and some separation will occur on the surface of the upper sieve as a function of the opening size and reciprocation of the upper sieve. That is, under ideal conditions, lighter elements of MOG will be carried by the air flow rearwardly over the upper sieve to be discharged in a desired manner from the combine, heavier elements of MOG will be carried rearwardly by the reciprocating action of the sieves, and grain will fall through the openings of the upper sieve.

When in operation, however, the limited portion of the flow of crop material including the increased density of grain and MOG directed toward the forward portion of the upper sieve having standard spacing between sieve fingers, results in crop material collecting and accumulating on the forward portion of the upper sieve. The accumulation of crop material can build to such an extent as to spill over the forward edge of the upper sieve to the clean grain pan bypassing the lower sieve or into the fan housing. Further, the higher rate air flow stream is unable to pass through the openings of the forward portion of the upper sieve to the extent that the ideal airborne separation above the upper sieve is severely limited or not present at all. As a result the amount of grain cleaned at the forward portion of the upper sieve is severely limited or reduced relative to the ideal situation.

Therefore, what is sought is a sieve for a combine grain cleaning system which overcomes one or more of the problems and shortcomings set forth above.

SUMMARY OF THE INVENTION

What is disclosed is a sieve for a combine grain cleaning system which overcomes one or more of the problems and shortcomings set forth above.

According to a preferred aspect of the invention, the sieve includes a plurality of louvers, each louver including a shaft carrying a plurality of fingers extending sidewardly therefrom at spaced apart locations therealong. Each of the shafts has at least one mounting portion of a predetermined sectional extent for supporting an adjacent region of the louver. The sieve includes a frame bounding a grain flow region, the frame including at least one elongate support element including laterally spaced apart longitudinally extending first and second edges, and a plurality of laterally extending arrays of slots at longitudinally spaced locations along the element. Each of the arrays of slots includes an entry slot disposed along the first edge of the element, a plurality of adjusting slots spaced longitudinally apart and extending toward the second edge, and a plurality of connecting slots extending between and connecting the entry slot and the adjusting slots of the array. Each of the slots is configured for receiving the mounting portion of one or more of the louvers, e.g., has a width marginally larger than the mounting portions of the shafts of the louvers, such that the mounting portions of individual ones of the shafts are receivable in any of the adjusting slots for positioning the louvers in spaced apart relation in the grain flow region. The mounting portions, when so received, are also preferably rotatable within the slots, to allow adjusting the angular orientation thereof for achieving desired grain passage size and air flow through the sieve.

As a result, the spacing between the adjacent ones of the louvers can be adjusted as desired or required for a particular grain or seed size, as well as other conditions. For instance, for a smaller grain size, a more closely spaced relation of the louvers can be selected, which has the advantage of enabling positioning the louvers in a more upright orientation compared to if a larger spacing were used, which can provide more upwardly directed air flow through the louvers, compared to a more laid down orientation. For larger grains, a larger spacing between the louvers can be selected. And, a mixture of smaller spacing for one or more regions of the sieve, and larger spacing for another region or regions, can be selected, for instance, where it is desired to utilize louvers with longer fingers, or where it may be desired for larger items of MOG to pass through the sieve, such as cobs or the like.

According to another preferred aspect of the invention, the arrays are fan shaped, such that the connecting slots extend at different angular orientations between the inlet slot and the adjusting slots. Representative fan shaped arrays can have, for instance, four or more adjusting slots, at desired spacing to provide useful spacing options for an anticipated range of grain or seed sizes. As another preferred aspect, the use of a single entry slot connecting with the adjusting slots via connecting slots, enables the support element to be stiffer and stronger, compared to the other multiple slot constructions, for instance wherein each slot for receiving a louver connects with the edge of the support element. As an advantage of this configuration, more than one, or multiple louvers can be supported within one array of slots.

According to another preferred aspect of the invention, the sieve includes at least one retainer element disposed in connection with the support element in covering relation to the entry slots, for preventing removal of the mounting portions of the louvers therethrough. The fan shaped array facilitates this by providing space on the support element for use of fasteners for attaching the retainer element to the support element.

According to another preferred aspect of the invention, the shafts of the louvers include eccentric adjusting portions, and the sieve comprises an elongate adjusting member disposed for engaging the adjusting portions of the shafts when the mounting portions thereof are disposed in the adjusting slots, respectively, to enable simultaneously rotating the shafts about the axes therethrough, respectively, for varying an angular position of the fingers of the louvers, for adjusting sizes of openings between adjacent ones of the louvers through which grain can pass. The adjustable spacing system of the invention, can be incorporated into any sieve, including, but not limited to, an upper sieve or chaffer, or a lower sieve, for a wide variety of combines.

DETAILED DESCRIPTION OF THE INVENTION

Figure 1:
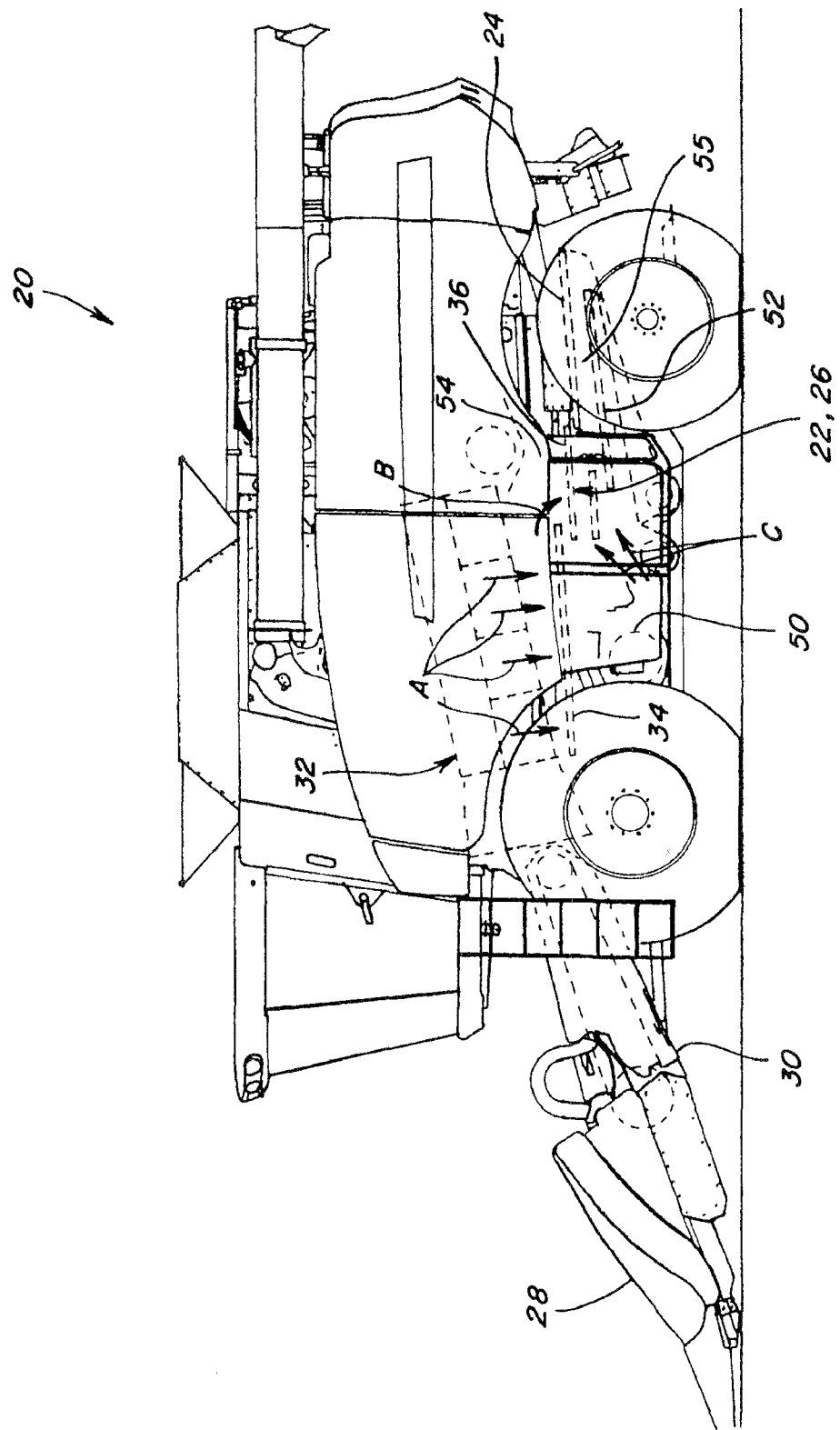
FIG. 1 is a side view of an agricultural combine having a cleaning system including a sieve with an adjustable spacing system according to the present invention.

Referring now to the drawings, wherein like numbers refer to generally like items or features, FIG. 1 shows a representative agricultural combine 20 including a cleaning system 22 having a sieve 24 with an adjustable spacing system 26 constructed and operable according to the present invention. Combine 20 includes a header 28 mounted on a front end thereof operable for severing crops from a field during forward motion of combine 20 and a feeder 30 operable for conveying the cut crops to a rotary threshing and separating system 32 within combine 20. Generally, threshing and separating system 32 includes one or more rotors at least partially enclosed by and rotatable within a corresponding number of perforated concaves. The cut crops are threshed and separated by the rotation of the rotor within the concave, and smaller elements of crop material including grain and particles of material other than grain (MOG), including particles lighter than grain, such as chaff, dust and straw, are discharged through perforations of the concave. Larger elements, such as stalks, leaves and the like are discharged from the rear of combine 20. Smaller elements of crop material are discharged through the perforations of the concave to a grain pan 34 disposed beneath threshing and separating system 32, as denoted by arrows A, for conveyance as a flow of crop material B, to a forward region 36 of sieve 24, which is an upper sieve of cleaning system 22 incorporating adjustable spacing system 26 of the invention.

Figure 2:
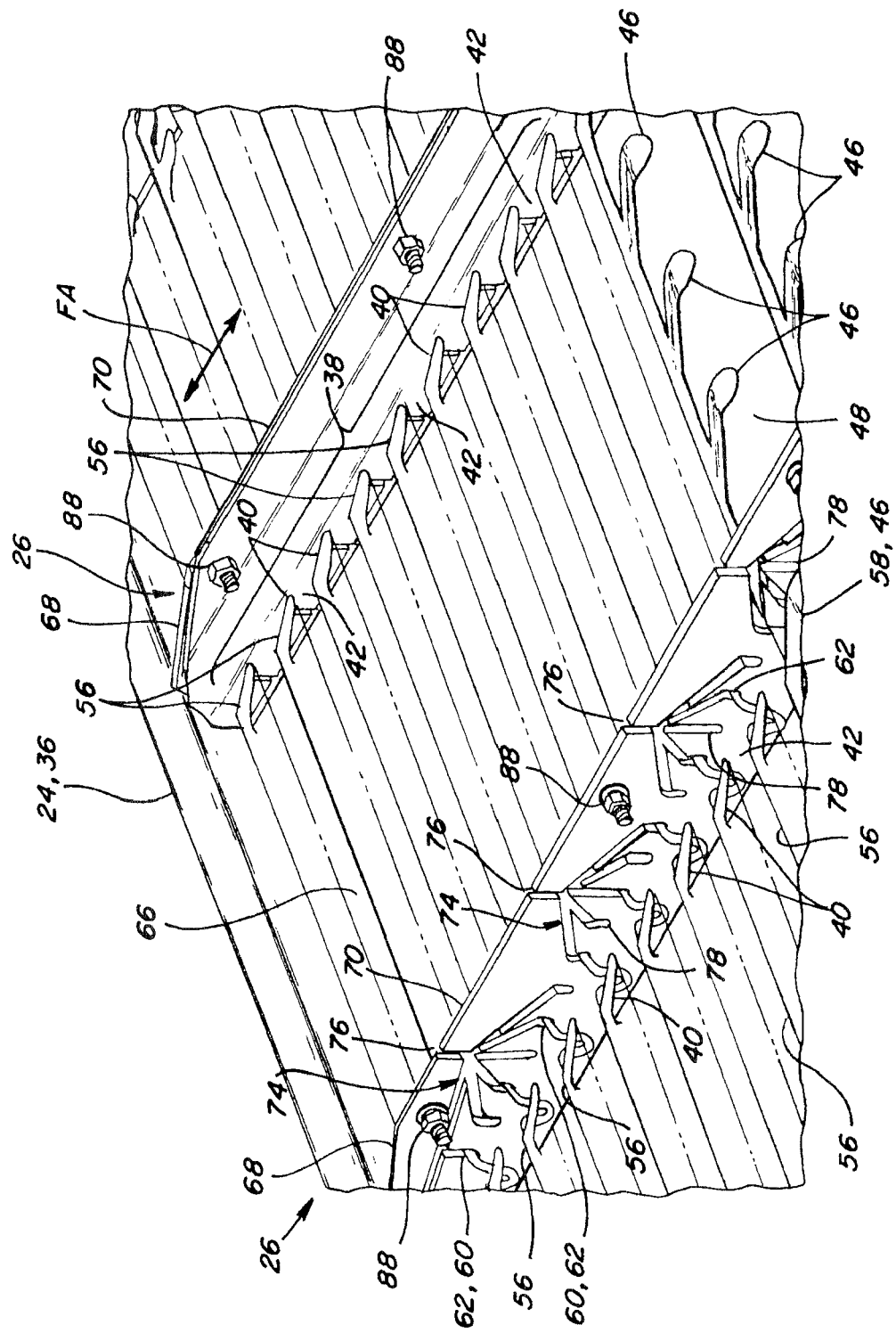
FIG. 2 is a perspective view of a sieve of the combine of FIG. 1, showing aspects of the adjustable spacing system of the invention.
Figure 3:
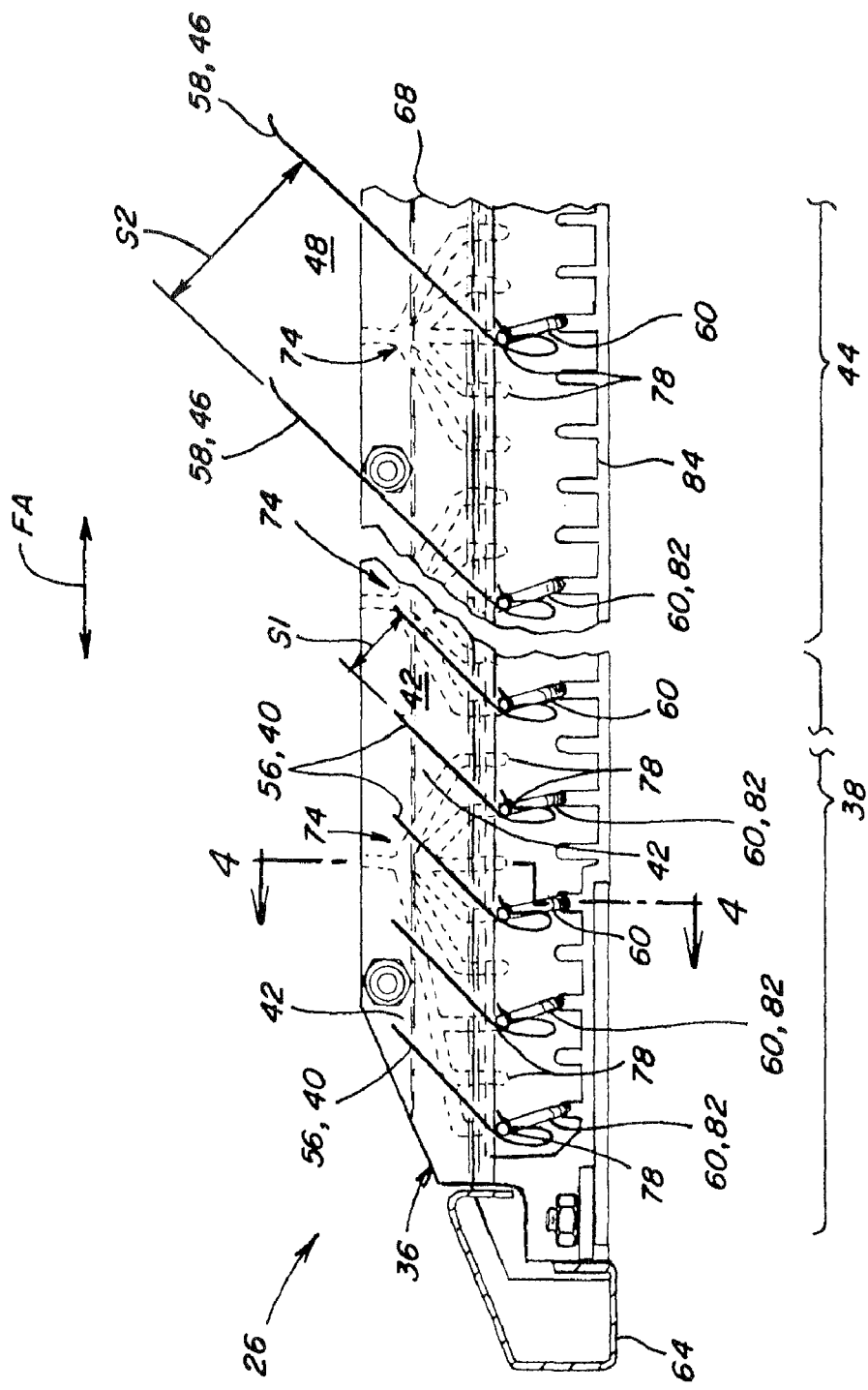
FIG. 3 is a fragmentary side view of the sieve showing aspects of the invention.

Referring also to FIGS. 2 and 3, forward region 36 of sieve 24 includes a first sieve region 38, which will typically be the forwardmost end of the sieve, including rows of first fingers 40 configured and oriented to define first openings 42 therebetween. A second sieve region 44 is disposed rearwardly of first sieve region 38 and includes rows of second fingers 46 configured and oriented to define second openings 48 therebetween. First openings 42 here are smaller than second openings 48 in at least the fore and aft direction FA, by dimensions measured and represented by S1 and S2, respectively (FIG. 3). Openings 42 and 48 define grain flow passages through sieve 24, dimensions S1 and S2 being selected for setting a maximum grain size that can pass through that passage. Cleaning system 22 includes a fan 50 operable for directing a flow of air C (FIG. 1) upwardly and rearwardly through openings 42 and 48 of upper sieve 36, and also through openings of a lower sieve 52 located below sieve 36, in the well known manner. Also in the well known manner, cleaning system 22 also includes apparatus (not shown) operable for reciprocatingly moving sieves 36 and 52, as well as grain pan 34 in the fore and aft direction FA, for propelling material thereon rearwardly.

As best illustrated in FIG. 1, in operation, harvested grain will typically be delivered by pan 34 onto forward region 36 of sieve 24, in a relatively heavy stream or flow. This grain will typically be mixed with MOG, much of which will typically be lighter than the grain. As part of the grain cleaning process, air flow C will flow through this falling material, with the intent that the heavier grain mostly fall onto region 36 (comprised of fingers 40 as shown in FIGS. 2 and 3), and if sufficiently small in size, will pass downwardly through openings 42, to lower sieve 52. The lighter MOG will be carried by the air flow rearwardly through a region 54 above sieve 24 and be discharged from the rear of combine 20. Some of the heavier MOG will also drop onto region 36, or onto second region 44, and can pass through openings 42 or 48 if sufficiently small, and otherwise will be carried rearwardly by the reciprocating action of sieve 24 and fall over the rear edge thereof. Grain and smaller MOG that passes through sieve 24 will either be blown rearwardly though a space 55 between the sieves and discharged, or be carried rearwardly on sieve 52 and reprocessed, and the remaining grain will pass through that sieve for collection, in the well known manner.

As noted in the Background section, grain or seed sizes harvested by combines such as combine 20 commonly range from the smallest wheat and rice, to the largest corn, soybeans and other legumes. Providing sieves, particularly upper sieves, for accommodating such wide ranges of sizes has typically entailed using one sieve for smaller grain sizes and another for larger sizes. However, even this approach has been less than satisfactory in many instances, particularly for the smallest and largest grain sizes, and wherein the fingers must be laid down a significant amount to achieve desired sizing.

Figure 4:
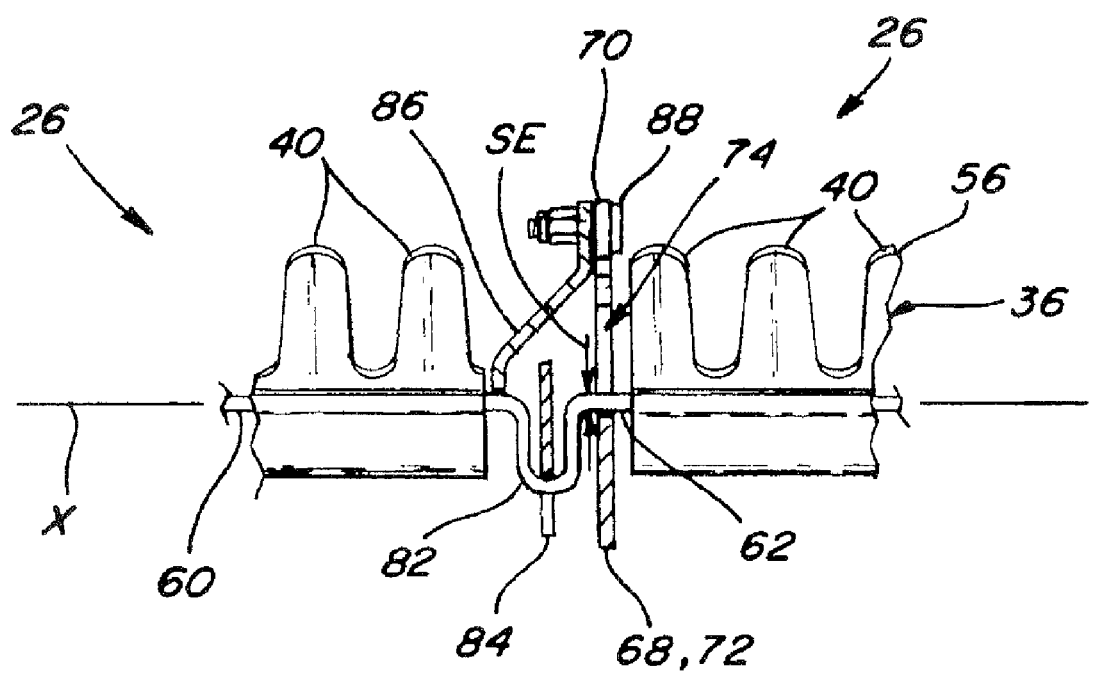
FIG. 4 is a sectional view along line 4-4 of FIG. 3.
Figure 5:
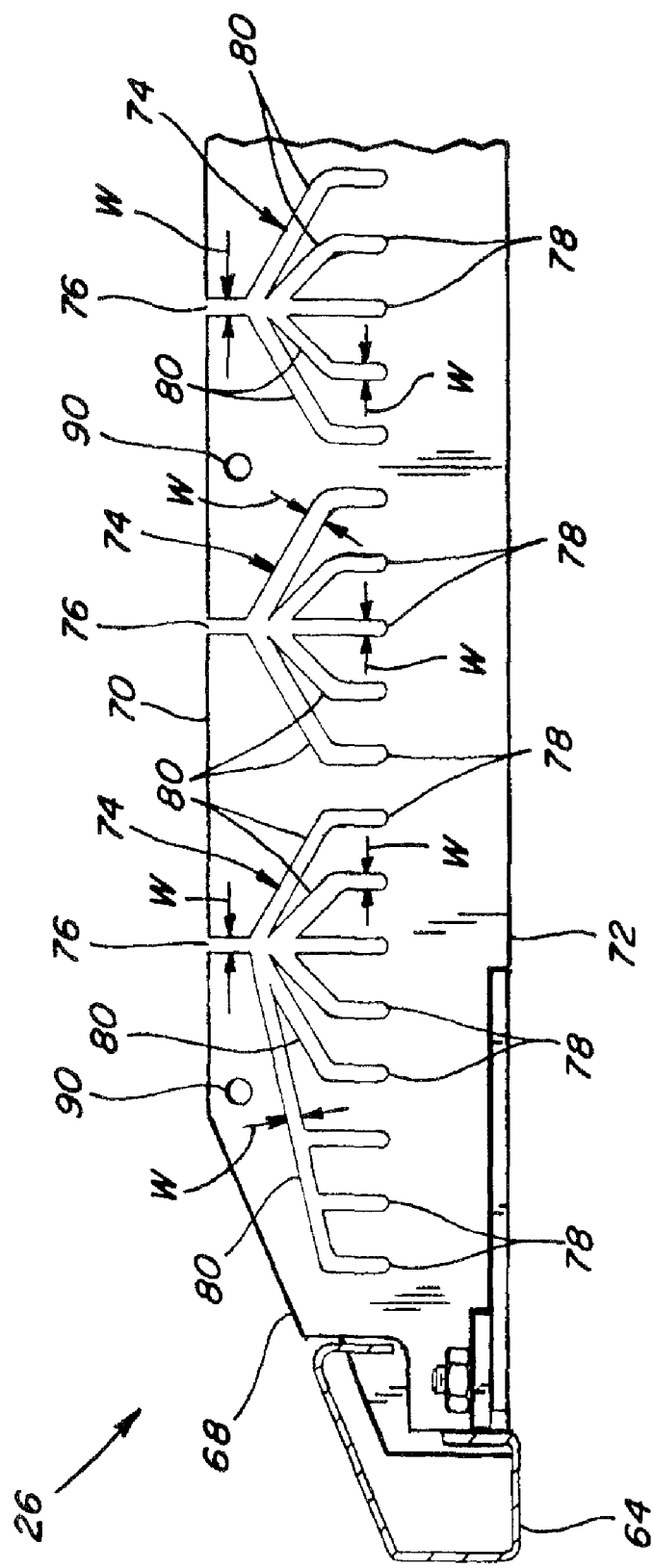
FIG. 5 is another fragmentary side view of the sieve, with louvers thereof removed to show aspects of a support element of the sieve.
Figure 6:
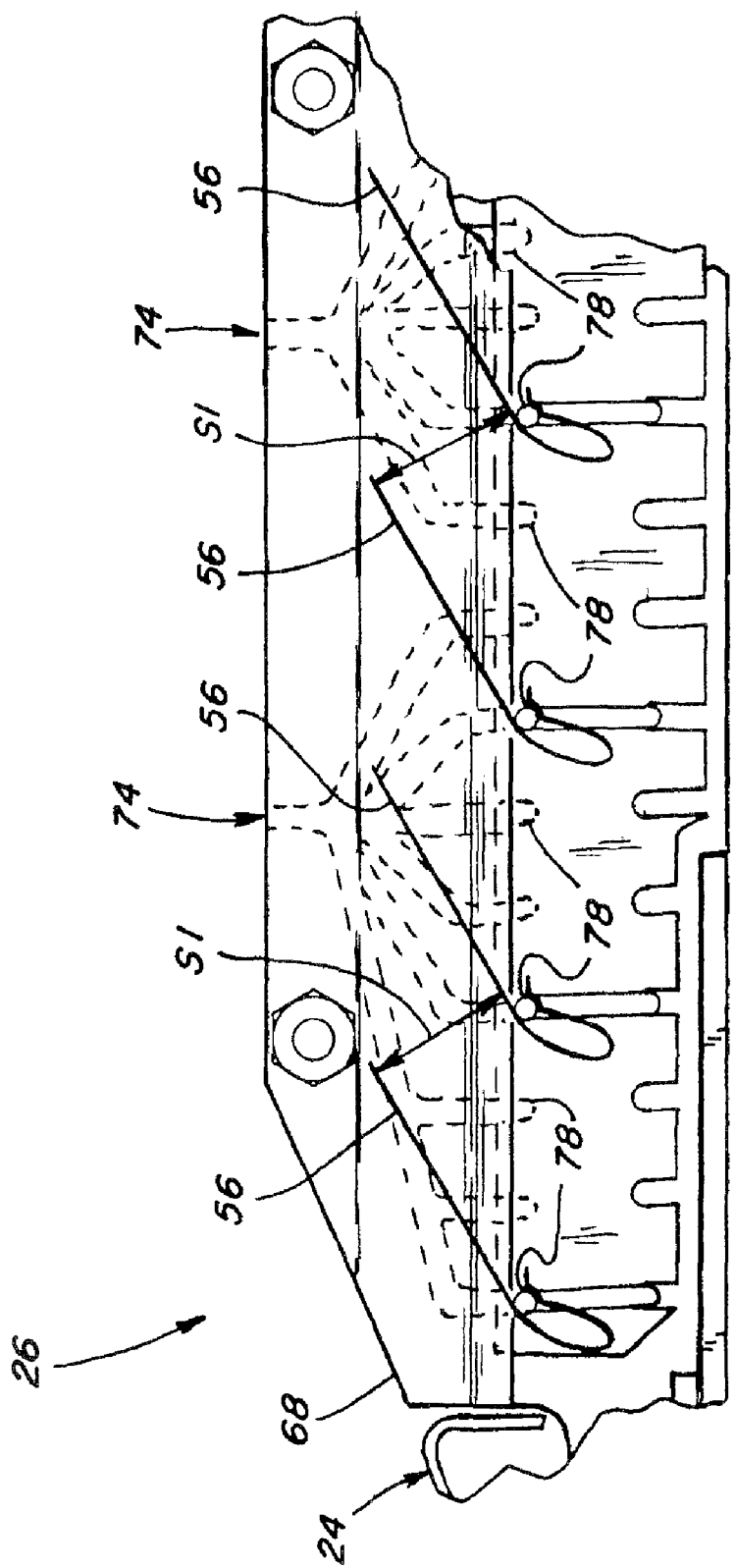
FIG. 6 is another fragmentary side view of the sieve showing an adjusting member thereof.

Referring also to FIGS. 4 and 5, adjustable spacing system 26 of the present invention addresses this problem, and eliminates or reduces the need for providing alternative sieves for different grain sizes. According to the invention, at least 24 is constructed of a plurality of louvers 56 and 58, each louver 56 and 58 including a shaft 60 of metal wire or other suitable construction carrying a plurality of fingers 40 or 46, respectively, of suitable material such as sheet metal or plastics extending sidewardly therefrom at spaced apart locations therealong. Each shaft 60 has at least one mounting portion 62 of a predetermined sectional extent SE (FIG. 5) for supporting an adjacent region of the louver. The sieve includes a frame 64 of sheet metal or other suitable construction bounding a grain flow region 66, frame 64 including at least one elongate support element 68 of sheet metal or the like including laterally spaced apart longitudinally extending first and second edges 70 and 72, and a plurality of laterally extending arrays of slots 74 at longitudinally spaced locations along support element 68.

Each of the arrays of slots 74 includes an entry slot 76 disposed along first edge 70 of support element 68, a plurality of adjusting slots 78 spaced longitudinally apart and extending toward second edge 72, and a plurality of connecting slots 80 extending between and connecting entry slot 76 and adjusting slots 78 of the array. Each of the slots 76, 78 and 80 is configured for receiving a mounting portion 62 of one or more of louvers 56 and 58, that is, it has a width W (FIG. 5) marginally larger than sectional extent SE of mounting portions 62, such that mounting portions 62 of individual ones of shafts 60 are receivable in any of adjusting slots 78 for positioning the louvers in spaced apart relation in grain flow region 66.

Mounting portions 62, when so received, are also preferably rotatable within slots 76, 78 and 80, to allow adjusting the angular orientation of fingers 40 and 46 for achieving desired grain passage size, e.g., increasing or decreasing S1 and S2, as well as affecting air flow through the sieve. To achieve this, shafts 60 preferably include adjusting portions 82, which here are eccentric to axes X through shafts 60 (FIG. 4), and sieve 24 includes an elongate adjusting member 84 disposed for engaging adjusting portions 82 when mounting portions 62 are disposed in adjusting slots 78, respectively, to enable simultaneously rotating shafts 60 about axes X therethrough, respectively, for varying an angular position of the fingers of the louvers, for adjusting sizes of openings S1 and S2. Adjusting member 84 is preferably an elongate member of sheet metal or other suitable construction and includes upwardly facing slots positionable in alignment with adjusting slots 78 for jointly receiving adjusting portions 82, there being a sufficient number of slots in the adjusting member to enable selecting any of the adjusting slots 78, and adjusting member 84 being movable longitudinally in direction FA for effecting the rotation of shafts 60.

Sieve 36 includes a retainer element 86 disposed in connection with support element 68, of suitable construction such as sheet metal, disposed in covering relation to entry slots 76, for preventing removal of shafts 60 therethrough and capturing the shafts in the selected adjusting slots 78. Retainer element 86 can be suitably held in place, such as with threaded fasteners 88 which pass through holes 90 through support element 68 (FIG. 5), so as to be easily removable to enable repositioning or reconfiguring the louver arrangement. Retainer element 86 also covers adjusting portions 82 of the louvers.

Figure 7:
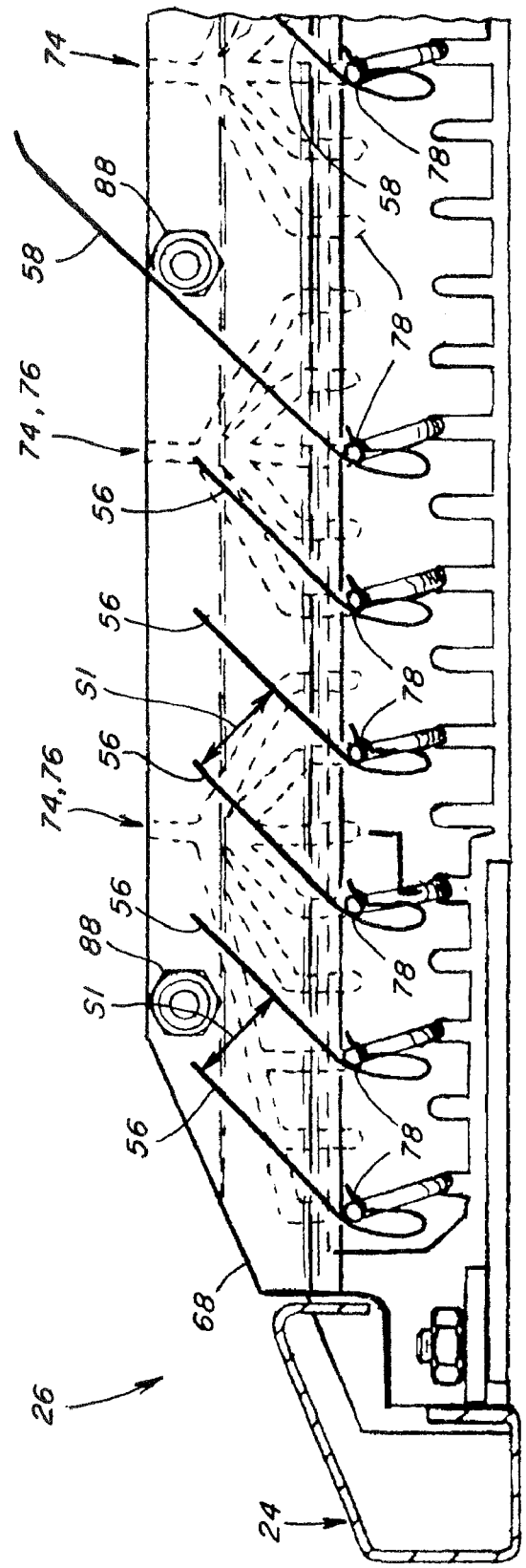
FIG. 7 is another fragmentary side of the sieve having a different louver configuration.
Figure 9:
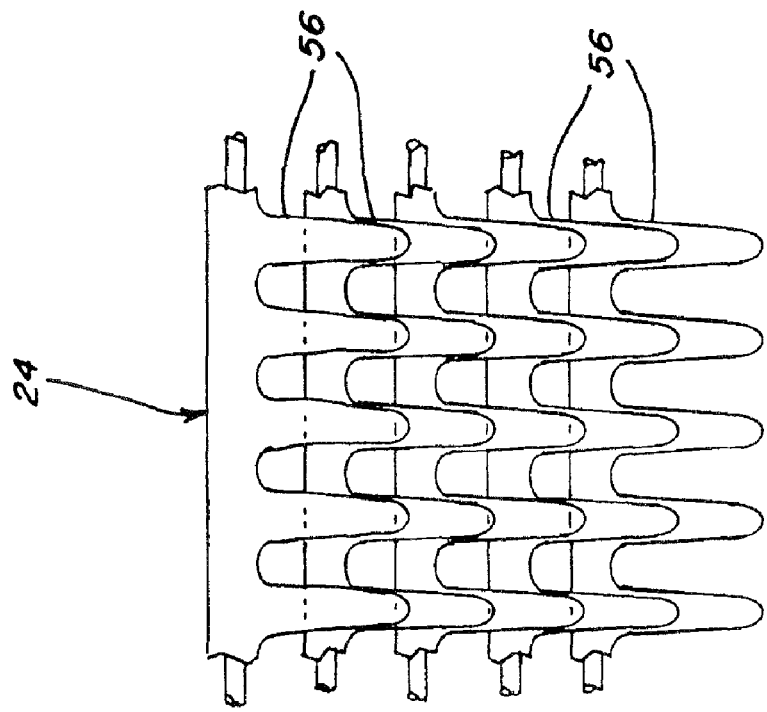
FIG. 9 is a fragmentary top view of the sieve, showing another louver configuration.
Figure 8:
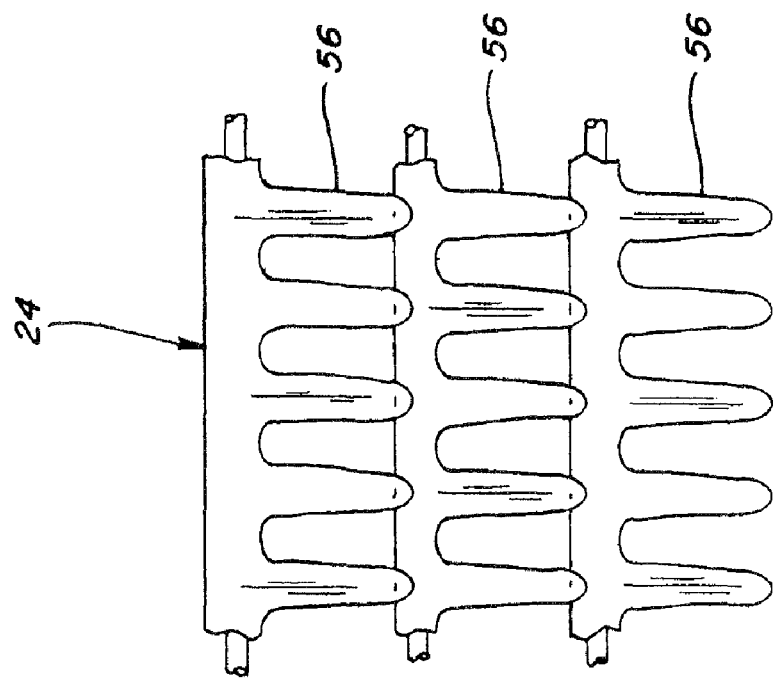
FIG. 8 is a fragmentary top view of the sieve, showing one louver configuration.

Referring also to FIGS. 6, 7, 8 and 9, an attendant advantage of adjustable spacing system 26 of the present invention is the ability to select the spacing, and number, of rows of louvers, such as louvers 56 and 58, of sieve 24, as well as the mix of louvers. Thus, examining FIGS. 6 and 7, louvers 56 are disposed in every third, and every other adjusting slot 78 of support element 68, respectively, to provide about equal spacings S1. However, as illustrated here and in FIGS. 8 and 9, which are top views of the setups of FIGS. 6 and 7 respectively, the spacings S1 are achieved with louvers 56 oriented at different angles, that is a more laid down angle in FIGS. 6 and 8, and a more upstanding angle in FIGS. 7 and 9. In FIG. 7 louvers 58 are shown disposed in every fifth slot 78 to illustrate even larger spacing, and the ability to mix spacings and louver types. By comparing the spacings illustrated in FIGS. 8 and 9 from the top, it can be seen that that differences in the grain flow passages through the louvers can be quite substantial. Also, it can be observed in FIGS. 7 and 9, that relatively small spacings can be achieved with more upright orientations of the louvers, to facilitate a more upwardly directed, and less restricted, air flow therethrough (as opposed to more rearward flow), to facilitate cleaning and separation of grain from MOG in the region above the sieve. A more upright louver orientation will also provide a more vertical grain flow path, which will be shorter, and be facilitated more by gravity, compared to a more laid down orientation, for better grain throughput. Also, because by using a greater concentration of fingers to achieve smaller grain flow passages, if required or desired, the fingers can be positioned in a more laid down orientation than shown in FIGS. 7 and 9, to achieve even smaller sizing.

As another advantage illustrated in FIG. 7, by using arrays 74 including a single entry slot 76 in connection with several adjusting slots 78, multiple louvers 56 and 58 can be inserted into respective arrays 74, so that fewer breaks in the upper edge of support element 68, which enables it to be stiffer and to provide space for placement of fasteners 88.

As still another advantage, regions of a sieve, e.g., a rear end portion, can have significantly fewer louvers, to provide large openings therebetween, for instance, to allow passage of corn cobs therethrough. Thus as an example of one contemplated sieve configuration for corn, a forward region 36 of a sieve could be provided with a first density of louvers 56 such as illustrated in FIGS. 6-9, a second sieve region could have a lower density of louvers 56 or 58, and a third rearmost region could have an even lower density, to enable whole cob flow through the sieve. Then, for other crops or conditions, the same sieve could be reconfigured differently and more advantageously for that crop and/or those conditions.

Figure 10:
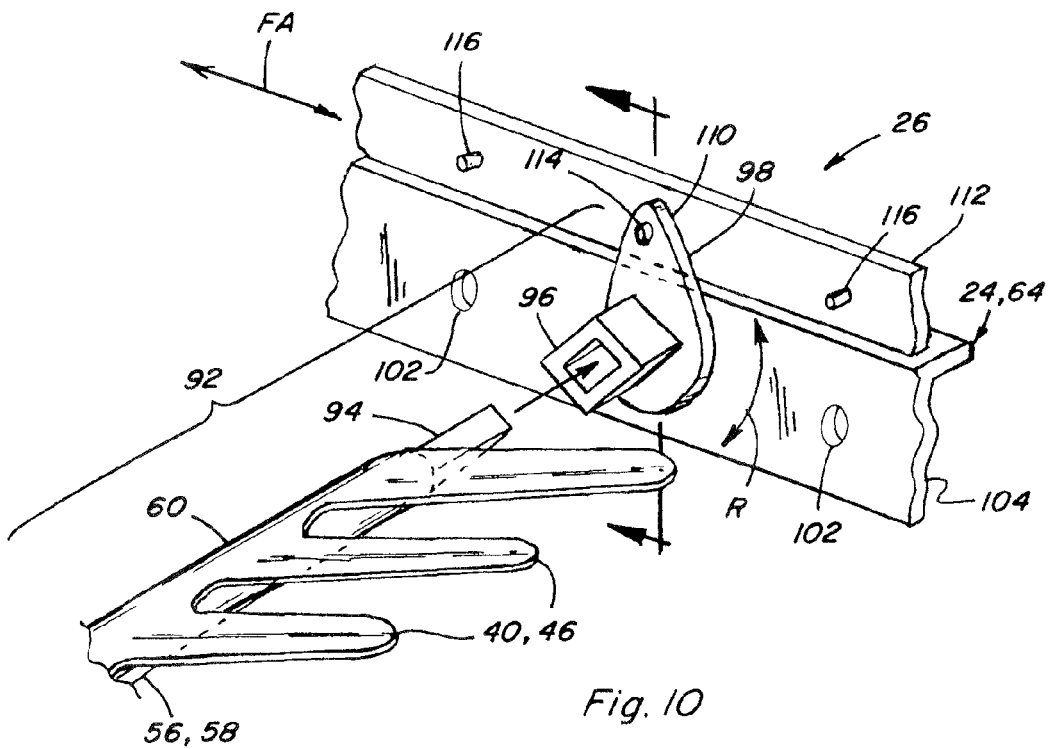
FIG. 10 is a fragmentary perspective view of the sieve, showing another embodiment of apparatus of the adjustable spacing system of the invention.
Figure 11:
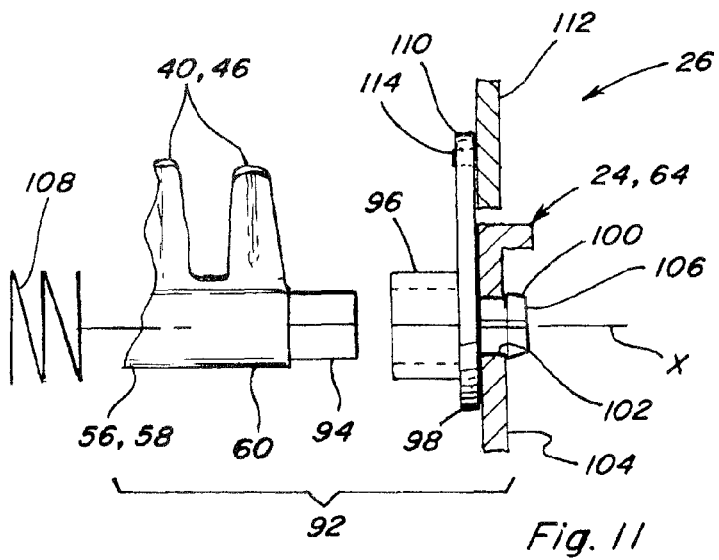
FIG. 11 is a sectional view of the apparatus of FIG. 10.

Referring also to FIGS. 10 and 11, alternative apparatus 92 for adjustable spacing system 26 of the invention is shown. Here, a representative louver 56 or 58 including fingers 40 or 46 is shown including a shaft 60 having a non-round shaped end portion 94, which here is rectangular. End portion 94 is cooperatively receivable in a correspondingly shaped receptacle 96 projecting from one side of a louver support element 98. Louver support element 98 has an opposite side including a shaft 100 projecting therefrom, which is cooperatively received in any of an array of holes 102 in a side rail 104 of frame 64 of sieve 24. Shaft 100 includes a detent 106 on the terminal or free end thereof for retaining it in the selected hole 102, while allowing rotation of louver support element 98, and a louver 56 or 58 supported thereby, about a pivotal axis X through the shaft, as denoted by arrow R in FIG. 10. Shaft 60 can be retained in receptacle 96 in any suitable manner, such as by a suitable spring 108, a detent, pinned connection, frictional fit, or the like. Louver support element 98 additionally includes an adjusting portion 110 offset from axis X, configured for connection to an adjusting member 112, e.g., by a pinned connection 114, for adjustably rotating element 98 and louver 56 or 58 about axis X and holding them in a selected angular orientation. Pins 116 are provided at intervals along adjusting member 112, corresponding to the locations of the alternative holes 112 in rail 104, to facilitate adjustability of any desired or required number of louver support elements 98 used to achieve desired louver spacing, and the angles of the louvers can be adjusted using the adjusting member 112, essentially in the above described manner with regard to adjusting member 84, e.g., movement in direction FA, with similar advantages as just explained.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. Accordingly, the following claims are intended to protect the invention broadly as well as in the specific form shown.

What is claimed is:

1. A grain cleaning sieve in a cleaning system of an agricultural combine, comprising:
a plurality of louvers, each louver including a shaft carrying a plurality of fingers extending sidewardly therefrom at spaced apart locations therealong, and each of the shafts having at least one mounting portion of a predetermined sectional extent for supporting an adjacent region of the louver; and
a frame bounding a grain flow region, the frame including at least one elongate support element including laterally spaced apart longitudinally extending first and second edges, and a plurality of laterally extending arrays of slots at longitudinally spaced locations along the element, each of the arrays of slots including an entry slot disposed along the first edge of the element, a plurality of adjusting slots spaced longitudinally apart and extending toward the second edge, and a plurality of connecting slots extending between and connecting the entry slot and the adjusting slots of the array, each of the slots having a width marginally larger than the mounting portions of the shafts, such that the mounting portions of the shafts are receivable in any of the adjusting slots for positioning the louvers in spaced apart relation in the grain flow region.

2. The sieve of claim 1, wherein each of the arrays of slots is fan shaped.

3. The sieve of claim 2 wherein each of the arrays includes at least four of the adjusting slots and the connecting slots.

4. The sieve of claim 3, wherein at least one of the arrays supports more than one of the louvers.

5. The sieve of claim 1, further comprising at least one retainer element disposed in connection with the support element in covering relation to the entry slots, for preventing removal of the mounting portions therethrough.

6. The sieve of claim 1, wherein the louvers are supported in selected ones of the adjusting slots such that some of the louvers are spaced apart by a first distance, and others of the louvers are spaced apart by a second distance greater than the first distance.

7. The sieve of claim 6, wherein said some of the louvers comprise a first sieve region, and said others of the louvers comprise a second sieve region.

8. The sieve of claim 7, wherein the fingers of the louvers of the first sieve region are shorter than the fingers of the louvers of the second sieve region.

9. The sieve of claim 1, wherein each of the shafts is rotatable about an axis therethrough and includes an adjusting portion eccentric about the axis, and the sieve comprises an elongate adjusting member disposed for engaging the adjusting portions of the shafts when the mounting portions thereof are disposed in the adjusting slots, respectively, for simultaneously rotating the shafts about the axes therethrough, respectively, for varying an angular position of the fingers of the louvers, for adjusting sizes of openings between adjacent ones of the louvers through which grain can pass.

10. A grain cleaning sieve in a cleaning system of an agricultural combine, comprising:
a plurality of louvers, each louver including a shaft carrying a plurality of fingers extending sidewardly therefrom at spaced apart locations therealong, and each of the shafts having at least one mounting portion configured for supporting the louver for rotation about a longitudinal axis through the shaft; and
a frame bounding a grain flow region of the sieve and incorporating an adjustable sieve spacing system including at least one elongate support element configured for supporting the louvers in spaced apart relation in the grain flow region, the support element including laterally spaced apart longitudinally extending first and second edges, and a plurality of laterally extending arrays of slots at longitudinally spaced locations along the element and configured for cooperatively receiving the mounting portions of the louvers, each of the arrays of slots including an entry slot disposed along the first edge of the element, a plurality of adjusting slots spaced longitudinally apart and extending toward the second edge, and a plurality of connecting slots extending at different angles in a fan pattern connecting the entry slot and the adjusting slots of the array, the mounting portions of the louvers being received in selected ones of the adjusting slots, respectively, such that adjacent ones of the louvers are supported by the at least one support element in spaced apart relation in the grain flow region.

11. The sieve of claim 10, wherein each of the arrays includes at least four of the adjusting slots and the connecting slots.

12. The sieve of claim 11, wherein at least one of the arrays supports at least two of the louvers.

13. The sieve of claim 10, further comprising at least one retainer element disposed in connection with the support element in covering relation to the entry slots, for preventing removal of the mounting portions of the shafts therethrough.

14. The sieve of claim 10, wherein the louvers are supported in selected ones of the adjusting slots such that some of the louvers are spaced apart by a first distance, and others of the louvers are spaced apart by a second distance greater than the first distance.

15. The sieve of claim 14, wherein said some of the louvers comprise a first sieve region, and said others of the louvers comprise a second sieve region.

16. The sieve of claim 15, wherein the fingers of the louvers of the first sieve region are shorter than the fingers of the louvers of the second sieve region.

17. The sieve of claim 1, wherein each of the shafts is rotatable about said longitudinal axis therethrough and includes an adjusting portion eccentric about the axis, and the sieve comprises an elongate adjusting member disposed for engaging the adjusting portions of the shafts when the mounting portions thereof are disposed in the adjusting slots, respectively, for simultaneously rotating the shafts about the axes therethrough, respectively, for varying an angular position of the fingers of the louvers, for adjusting sizes of openings between adjacent ones of the louvers through which grain can pass.

* * * * *